US010656643B1

United States Patent
Bertram et al.

(10) Patent No.: US 10,656,643 B1
(45) Date of Patent: May 19, 2020

(54) SAFE AND SECURE PRACTICAL AUTONOMY

(71) Applicant: Rockwell Collins, Inc., Cedar Rapids, IA (US)

(72) Inventors: Joshua R. Bertram, Ames, IA (US); Brian R. Wolford, Cedar Rapids, IA (US); Angus L. McLean, Bradenton, FL (US); Alexander V. Roup, Centreville, VA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 266 days.

(21) Appl. No.: 15/629,548

(22) Filed: Jun. 21, 2017

(51) Int. Cl.
| | | |
|---|---|---|
| *G01C 23/00* | (2006.01) | |
| *G05D 1/00* | (2006.01) | |
| *G05D 3/00* | (2006.01) | |
| *G06F 7/00* | (2006.01) | |
| *G06F 17/00* | (2019.01) | |
| *G08G 5/00* | (2006.01) | |
| *G05D 1/10* | (2006.01) | |
| *G06N 20/00* | (2019.01) | |
| *G06F 17/10* | (2006.01) | |
| *G06G 7/78* | (2006.01) | |
| *G08G 1/16* | (2006.01) | |
| *B64C 13/18* | (2006.01) | |

(52) U.S. Cl.
CPC ......... *G05D 1/0077* (2013.01); *G05D 1/0088* (2013.01); *G05D 1/101* (2013.01); *G06N 20/00* (2019.01); *G08G 5/0013* (2013.01); *B64C 13/18* (2013.01)

(58) Field of Classification Search
CPC .... G05D 1/0077; G05D 1/0088; G05D 1/101; G06N 20/00; G08G 5/0013; G08G 5/00; G08G 5/0091; G08G 5/003; B64C 13/18
USPC ....................................................... 701/3, 301
See application file for complete search history.

(56) References Cited

U.S. PATENT DOCUMENTS

| | | | |
|---|---|---|---|
| 2010/0332136 A1* | 12/2010 | Duggan ............... | G08G 5/0069 701/301 |
| 2017/0126745 A1* | 5/2017 | Taylor .................. | H04L 63/205 |
| 2018/0247160 A1* | 8/2018 | Rohani .................. | B25J 9/161 |
| 2018/0247547 A1* | 8/2018 | Karunakar ............ | G08G 5/003 |
| 2019/0047700 A1* | 2/2019 | Liu ....................... | B64C 39/024 |

\* cited by examiner

*Primary Examiner* — Mahmoud S Ismail
(74) *Attorney, Agent, or Firm* — Suiter Swantz pc llo (57) ABSTRACT

Safe practical autonomy is ensured by encapsulating an unreliable or untrusted machine learning algorithm within a control-based algorithm. A safety envelope is utilized to ensure that the machine learning algorithm does not output control signals that are beyond safe thresholds or limits. Secure practical autonomy is ensured by verification using digital certificates or cryptographic signatures. The verification may be for individual partitions of an autonomous system or apparatus. The partitions include trusted and untrusted partitions. Trusted partitions are verified for security, while untrusted partitions are verified for safety and security.

8 Claims, 8 Drawing Sheets

SAFE AND SECURE PRACTICAL AUTONOMY

The present application is related to the following listed application(s) (the "Related Applications"). All subject matter of the Related Applications and of any and all parent, grandparent, great-grandparent, etc. applications of the Related Applications is incorporated herein by reference to the extent such subject matter is not inconsistent herewith.

RELATED APPLICATIONS

The present application is related to U.S. patent application Ser. No. 15/629,555, entitled LEARNING FROM OPERATOR DATA FOR PRACTICAL AUTONOMY, naming Joshua R. Bertram and Angus L. McLean as inventors, filed Jun. 21, 2017.

BACKGROUND

Society is becoming increasingly automated. Automation is found on industrial assembly lines, in consumer devices including cars, mobile devices, and automated teller machines (ATMs), to name a few, and also in commercial equipment and vehicles, military equipment, construction equipment and machinery, naval and water-based vessels/vehicles, and much more. However, in many instances automation has not risen to the level of autonomy because some tasks are so complex that defining variables and conditional statements for each possible contingency is impractical.

Further, when automated systems handle private information, security is often a high priority. However, some safety-critical systems are highly dependent upon safety in addition to security. For example, automated passenger vehicles, unmanned vehicles, vehicles with an autopilot, automated water, naval, land-based, tactical, or other similar vehicles and/or vessels, require unequivocal assurance that the systems being operated, directed, commanded, or controlled will perform exactly as they have been programmed or exactly as intended. When lives are at stake, the need for unequivocal assurance only increases.

While technology continues to improve at a rapid rate, automated systems are being optimized to increase their ability to perform difficult tasks. However, the ability to perform these difficult tasks often precedes quality control, integrity analysis, and adequate safety and risk assessments and assurances. Rather than impede the advancement of technology, structure or steps need to be implemented to ensure that both safety and security are unequivocally assured for automated devices, safety-critical systems, or systems capable of performing increasingly difficult tasks.

SUMMARY

In one aspect, embodiments of the inventive concepts disclosed herein are directed to an apparatus for safe and secure practical autonomy. The apparatus may include a controller having a non-transitory memory with instructions thereon and a processor in communication with the non-transitory memory, where the processor may be configured to access the instructions. The apparatus may include at least one port for receiving a real-time operational parameter for generating a navigational solution including a platform maneuver based on the real-time operational parameter and a position. The apparatus may include a machine learning module that is communicatively coupled to the controller. In one aspect, the instructions of the controller provide the processor access to a machine learning algorithm of the machine learning module to generate the navigational solution and direct the platform maneuver based on the position. The apparatus may include a safety monitor implementing a certifiable control algorithm and an operational safety envelope to preempt the machine learning module when the maneuver is outside the operational safety envelope.

In another aspect, embodiments are directed to a system for safe and secure practical autonomy. The system may include a non-transitory memory having instructions thereon and a processor in communication with the non-transitory memory, the processor configured to access the instructions to perform or direct steps. A step performed by the system may include determining a first navigational solution using a first controller, the first navigational solution being based on a real-time parameter and including a first maneuver, the real-time parameter being received from an observation sub-system communicatively coupled with the processor. Another step may include determining if the first maneuver, or an output used to determine the first maneuver, are within an operational envelope or a baseline set by a safety monitor. Another step may include performing the first maneuver or providing first output for the first maneuver when the first maneuver, or the output associated with the first maneuver, are within the envelope or the baseline set by the safety monitor. Another step may include enabling a second controller to generate a second navigational solution, perform a second maneuver, or generate second output for the second maneuver when the first navigational solution, or the output used to determine the first maneuver, are outside the envelope or the baseline set by a safety monitor.

In another aspect, embodiments are directed to a system for safe and secure practical autonomy, where the system may include a vehicle incorporating an observation sub-system for observing a real-time parameter, one or more non-transitory memories having instructions thereon, and multiple processors. The system may further include a first controller having a first processor of the multiple processors configured to access a first set of instructions to perform or direct first steps, the first steps including: determining a first navigational solution based on the real-time parameter, the first navigational solution including a first maneuver. The system may further include a second controller having a second processor of the multiple processors configured to access a second set of instructions to perform or direct second steps, the second steps including: determining if first navigational solution, the first maneuver, or an output to be used to perform the first maneuver are within an envelope or a baseline set by a safety monitor; and preempting the first controller to determine, generate, perform, or direct a second navigational solution including a second maneuver when the first navigational solution, the first maneuver, or the output to be used to perform the first maneuver are outside the envelope or the baseline set by the safety monitor.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

"Autonomy" or "autonomous" as used herein shall mean an ability to perform a task at a level of complexity akin to the complexity of human intuition. The higher a system is on the complexity curve, the more autonomy the system has, and the more value will be attached to that system.

"Automation" as used herein shall mean the use of machinery to perform tasks normally performed by humans, being bounded or limited on an optimization curve with respect to the difficulty of tasks the machinery can perform. In other words, although automated systems may be increasingly optimized, even the most optimized automated system does not cross a gap that exists between optimized automated systems and autonomous systems.

"Maneuver" as used herein shall mean the use of kinematic and potential forces to produce a movement or a series of movements, which are usually performed by an object, machine, or vehicle, with respect to another object, machine, or vehicle (e.g., evasive, tactical, and/or formation maneuvers).

"Memory" as used herein, and unless otherwise specified, means any storage medium known in the art suitable for storing program instructions executable by an associated one or more processors (e.g., computer executable program code). Memory may also be stored in an organized format, encompassing, for example, a database. Memory may include one or more storage mediums. For example, memory may include, but is not limited to, a read-only memory, a random access memory, a magnetic or optical memory device (e.g., disk), a magnetic tape, a solid state drive, or combinations thereof. In embodiments, memory includes a buffer (e.g., frame buffer) and/or a cache. The memory includes non-transitory memory. In embodiments, the memory may be located remotely with respect to the platform.

"Processor" as used herein means any processing device, including but not limited to, a microprocessor, an application specific integrated circuit (ASIC), a field programmable gate array (FPGA), a central processing unit (CPU), an arithmetic logic unit (ALU), a digital signal processor (DSP), or combinations thereof.

"Module," "block" or "sub-block" as used herein means a combination of hardware and software configured to perform one or more steps, processes and/or algorithms of the inventive concepts disclosed herein.

"Practical" as used herein with respect to autonomy or an autonomous system means capability of a system to take a complex multivariate task and implicitly determining one or more automated solutions for performing the task based on observed/imaged responses, a set of rules, a set of contingencies, a set of conditional statements, and combinations thereof.

"Trace" as used herein means a sequence of visible or observable events representing a possible behavior. For example, the possible behavior may be how a maneuver is performed.

Broadly, the inventive concepts disclosed herein are directed to systems, apparatuses, and methods for reliable, safe and secure, machine-implemented, practical autonomy. Systems and apparatuses disclosed herein are implemented in such a way to provide operators of autonomous machines and vehicles, including unmanned vehicles, water, naval, land-based, tactical, or other similar vehicles and/or vessels, assurance that the autonomous systems being operated, directed, commanded, or controlled will perform as intended.

Systems and apparatuses disclosed herein utilize machine learning (ML) algorithms for maneuver guidance and control. Such algorithms may not be completely reliable. For example, a ML algorithm may often be in a research state, may implement or may be implemented in innovative new technology or a complex behavior, and may be hard to verify or certify to industry standards (e.g., FAA regulations, standards by American National Standards Institute (ANSI), etc.). Therefore, in embodiments one or more ML algorithms are encapsulated by one or more control-theory based algorithms or by a system implementing the one or more control-theory based algorithms. Control-theory based systems and algorithms are mathematically verified, vetted for errors, backed by the strength of the industry, implement or build on mature technology, are certifiable, or are verifiable, which may ensure safety. Further, data that is input, output, or exchanged undergoes data validation and/or data integrity analysis at every stage of the system, thereby ensuring security. Thus, both safety and security are ensured by the inventive concepts disclosed herein despite the use of one or more potentially untrusted or unreliable ML algorithms.

It is noted that while specific examples, depictions, or exemplary embodiments may reference an aircraft or avionics, persons skilled in the art will recognize the inventive concepts are equally applicable to any automated machine, including but not limited to, a precision guided vehicle, such as water, naval, land-based, or other similar vehicles and/or vessels.

Figure 1:
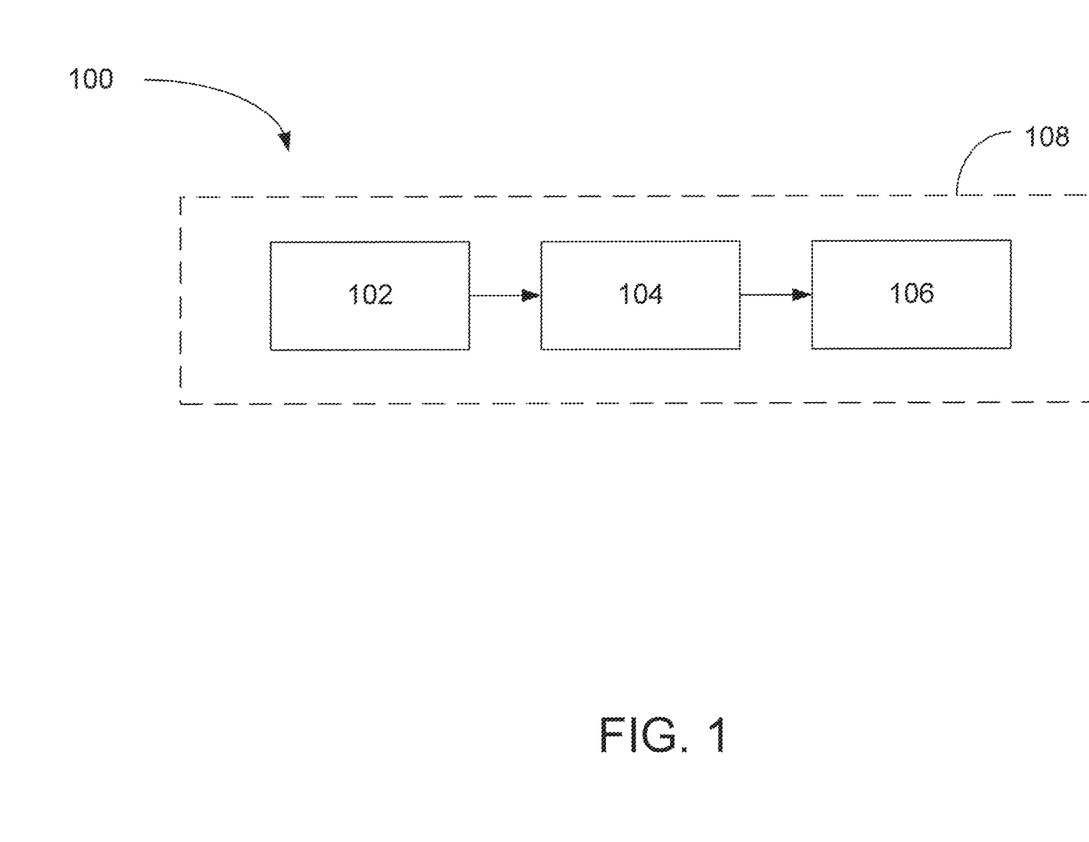
FIG. 1 is an exemplary embodiment of a block diagram of a system for safe and secure practical autonomy according to the inventive concepts disclosed herein.

Referring now to FIG. 1, a block diagram of an exemplary embodiment of an autonomous system 100, according to the inventive concepts disclosed herein is shown implementing both ML and control-theory based algorithms. The system 100 includes an observation sub-system 102, a ML module 104, and a failsafe controller 106 for AI based on both inference and observation. For example, the observation sub-system 102 may observe or image a real-time parameter associated with a complex task (e.g., formation flight), generating output (e.g., radar returns) that may be analyzed and processed to determine a position of a platform 108 to which system 100 may be attached. The ML module 104 may use a ML algorithm to receive the position of the platform 108 and estimate a current state of the platform 108. The ML module 104 may issue control commands for performing a known maneuver, an estimated maneuver, or a fail-safe maneuver based on the current state of the platform 108. The failsafe controller 106 may receive the control commands and monitor them using a control-theory based algorithm. The monitoring may enable a determination as to whether the control commands result output that is within a safety envelope or baseline for safe operation of the platform 108. For instance, the observation sub-system 102 may observe pulsed laser returns from a Light Detection and Ranging (LIDAR) sensor and generate output that is utilized for determining the relative position of the platform 108. By way of another example, the observation sub-system may utilize a camera for imaging real-world, identifiable features and performing a simultaneous localization and mapping (SLAM) relative position determination. It is noted that other sensors may be included in the observation sub-system 102 for generating a position of the platform 108, including but not limited to, and an ADS-B receiver, a GPS receiver, a differential GPS receiver, another precision navigation system, a radio for performing angle of arrival (AOA) or time difference of arrival (TDOA), or combinations thereof.

Figure 2:
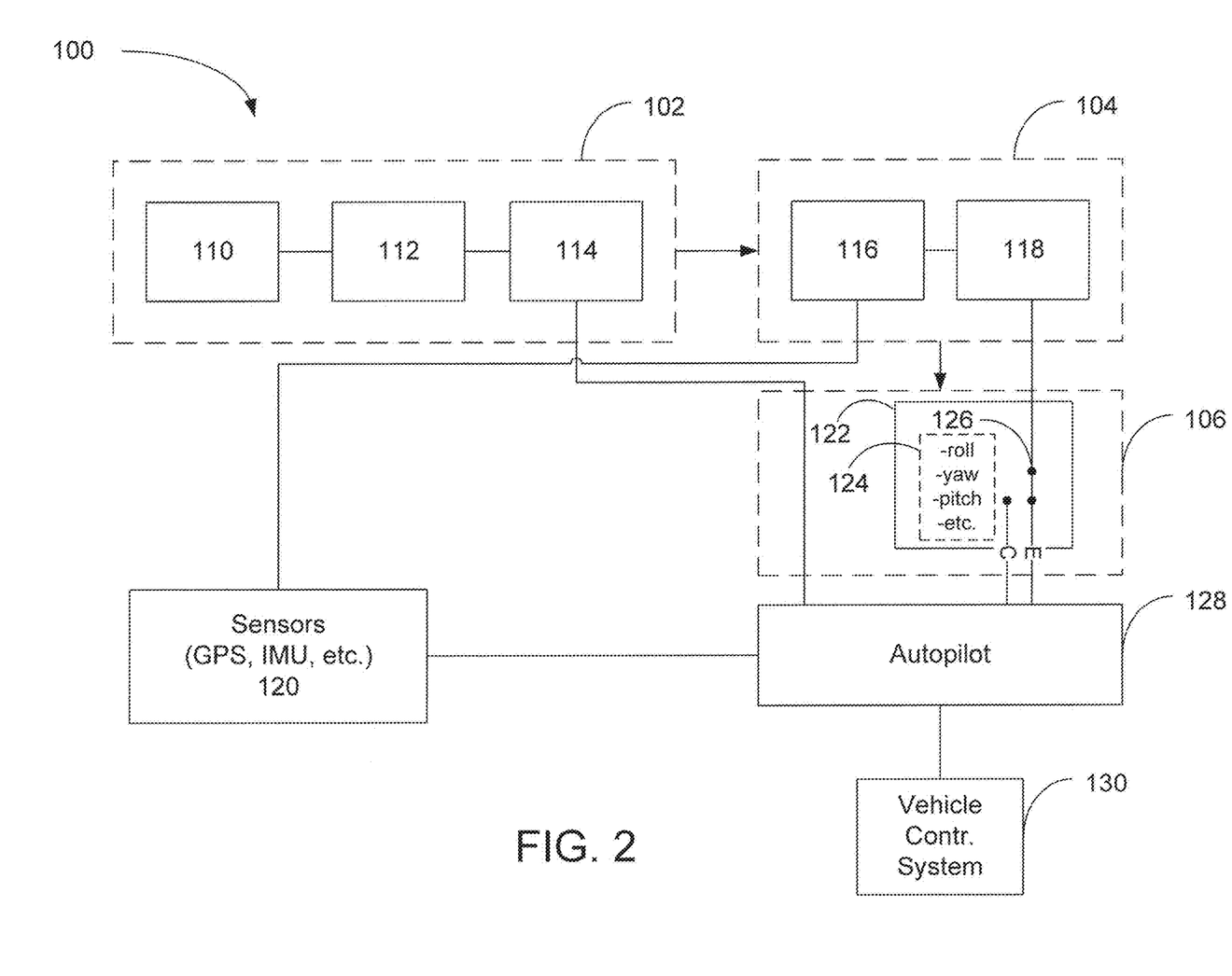
FIG. 2 is an exemplary embodiment of a block diagram of a system for safe and secure practical autonomy according to the inventive concepts disclosed herein.

Referring now to FIG. 2, a block diagram including a more detailed arrangement of the observation sub-system 102, the ML module 104, and the failsafe controller 106 of the system 100 is depicted. In some embodiments, the observation sub-system 102 includes an input sensor 110. For example, the input sensor 110 may include, but is not limited to, a first camera for obtaining real-world, observeable or identifiable features and obtaining a navigational solution for, or a relative position of, the platform 108. For instance, the observation sub-system 102 may send images from the camera implemented as the input sensor 110 to an image processor 112 for performing a relative navigation (RELNAV) algorithm (e.g., simultaneous localization and mapping (SLAM) algorithm) within a RELNAV module 114. By way of another example, the input sensor 110 sensor may include a second camera for imaging or collecting video feed of a pilot or a pilot's movement of a control stick. By way of yet another example, the input sensor 110 may include a microphone (not shown) together with a module having voice recognition and validation software thereon for receiving, observing, and monitoring voice commands.

In an exemplary embodiment, the system 100 may be implemented on different types of platforms 108 such as manned or unmanned vehicles, and the observation sub-system 102 may include one or more additional components depending on the implementation. For example, the platform 108 may include, but is not limited to, a passenger aircraft with an autopilot, an unmanned aerial vehicle (UAV), an unmanned aircraft system (UAS), a naval vessel, a manned or unmanned tactical vehicle, or combinations thereof. In this regard, if the observation sub-system 102 is implemented on or within a UAS, the input sensor 110 may include one or more cameras and/or image processors located at a remote facility. Images taken at the remote facility may be used for training output of the system 100 with/against operational input data observed or imaged at the remote facility.

In some embodiments, the ML module 104 may include memory and one or more processors to receive the navigational solution or the relative position from the observation sub-system 102 and estimate a state of the platform 108. It is noted that the ML module 104 may also be in communication with other systems and components of the platform 108 in order to make real-time determinations regarding maneuvers. For example, if the ML module 104 is implemented on an aircraft, then the ML module 104 may be in communication with aircraft sensors 120, including but not limited to, a global positioning system (GPS), a compass, an altimeter (e.g., radar altimeter or a ground tracking radar device), an inertial measurement unit (IMU), a fiber optic gyroscope, a bubble level, an accelerometer, a pitot tube, a passive infrared sensor, a positional head-tracking sensor, an optical sensor, a sonic sensor, a Global Navigation Satellite Systems (GNSS) system receiver, an antenna, one or more additional receivers and/or transceivers, or combinations thereof. It is noted that the communicative coupling between aircraft sensors 120 and ML module 104, or between input sensor 110 and ML module 104 may enable the ML module to obtain one or more observable parameters.

In some embodiments, the ML module 104 estimates the state using a ML algorithm including, but not limited to a neural network (e.g., with states represented as nodes and hidden nodes and transitioning between them till an output is reached via branch metrics), a kernel-based classification method, a Support Vector Machine (SVM) approach, canonical-correlation analysis (CCA), factor analysis, flexible discriminant analysis (FDA), principal component analysis (PCA), multidimensional scaling (MDS), principal component regression (PCR regression), projection pursuit, and combinations thereof. In embodiments, the ML module 104 includes multiple portions for performing different aspects of the ML algorithm(s). For example, the ML module 104 may include a first controller 116 and a second controller 118. The first controller 116 may be configured for performing unsupervised learning aspects of the ML module 104, including but not limited to, data mining, prediction-making, or exploratory data analysis, while the second controller 118 may implement supervised learning aspects. For instance, the supervised learning aspects may include definitions and semantics defined and used by an operator that translate a position of a first aircraft relative to a second aircraft into a meaningful representation used by pilots (e.g., aircraft-1 behind 45-degree bearing line of aircraft-2="sucked"). The supervised learning aspects may also include output generated by the second controller 118 for maneuvers to be performed. In some embodiments, the ML module 104 may implement fuzzy logic, such that a result of one or more partial truth values may be output (e.g., from the neural net) instead of a complete truth or complete false value (e.g., as in Boolean logic).

In some embodiments, the failsafe controller 106 may be directly or indirectly in communication with the ML module 104 to receive the control commands and monitor them using a control-theory based algorithm. For example, the failsafe controller 106 may include a safety monitor 122 that checks a control command against a baseline or a threshold that is set for that control command, wherein if the control command is above the baseline or beneath the threshold, then the control command is safe for its intended purpose (e.g., performing a "break-up" maneuver). By way of another example, the failsafe controller 106 may check multiple control commands against appropriate safety levels. In this regard, a safety envelope 124 is formed by the multiple baselines and/or thresholds for the multiple control commands, and as long as operation of the platform 108 stays within the safety envelope 124 safety is guaranteed such that even if a malicious attacker (e.g., a hacker) is somehow able to interfere with an intended mission of the platform 108, the attacker would not be able to wreck, crash, or exceed operational limits of the platform 108. For instance, the safety envelope 124 may include a limit, threshold, baseline, or appropriate safety level for two or more observable or real-time parameters including, but not limited to: maximum/minimum safe altitudes; allowable single-axis control parameters for maintaining flight with respect to a roll axis; allowable two-axis control parameters for maintaining flight with respect to a pitch axis and the roll axis; allowable three-axis control parameters for maintaining flight with respect to the roll axis, the pitch axis, and a yaw axis; allowable parameters for performing landing, rollout, and taxi; allowable parameters for stabilizing flight using a stability augmentation system (SAS); a geofence boundary; a traffic collision detection (e.g., minimum separation distance); safe flight envelope detection; limits on roll; limits on pitch; limits on yaw; limits on roll, pitch, and yaw; limits on descent rate; limits on flight path angle; limits on airspeed; limits on Mach number; limits on load or load factor; limits on aerodynamic angles (e.g., alpha, beta); limits on control surface deflection; limits on control surface pressure; other allowable parameters and/or limits; and combinations thereof.

In some embodiments, the safety monitor 122 and the safety envelope 124 are implemented to ensure safety of each phase of maneuvering. For example, the platform 108 may be an aircraft and the safety monitor 122 and the safety envelope 124 may ensure safety of each phase of flight, including but not limited to, landing, rollout, and taxi, takeoff, descent, final approach, and cruising or level-flight. For instance, the safety envelope 124 may ensure that only allowable parameters are input into a flight management system (FMS) or a flight control system (FCS) and that safe operational limits are not exceeded by output from the FCS.

It is noted that the same first real-time parameter used for obtaining a position of the platform 108 may be used together with a second real-time parameter in establishing the safety envelope 124. For example, a radar return of an aircraft may be obtained as the first real-time parameter. This radar return may be used together with a separation distance threshold to establish the safety envelope 124, or to establish at least a portion of the safety envelope 124.

In some embodiments, the failsafe controller 106 includes a trusted or vetted control-theory algorithm. For example, the safety monitor 122 may utilize a control algorithm including, but not limited to, proportional control, feedback control, feedforward control, integral control, proportional-derivative (PD) control, proportional-integral (PI) control, proportional-integral-derivative (PID) control, or combinations thereof. Other means for making the failsafe controller 106 more trusted or reliable may be utilized. For example, the failsafe controller 106 may be implemented within the FMS or together with the FMS (or other system integrator), and it may be designed to a highest standard of aviation design such as a DO178C design assurance level (DAL) A, a DO254 DAL A, or a similarly high standard. In other embodiments, the DAL of the failsafe controller 106 includes a DAL B, a European equivalent by the European Aviation Safety Agency (EASA), a design standard by a similar agency, or combinations thereof.

In some embodiments, the failsafe controller 106 is certified by an appropriate authority. For example, if the platform 108 is an aircraft, the failsafe controller 106 may be certified by Federal Agency of Aviation (FAA) standards or industry standards similar or identical to these that may include, but are not limited to, standards produced by the American National Standards Institute (ANSI) or a similar organization. For example, certification may include performing gain scheduling for the failsafe controller 106. For instance, the failsafe controller 106 may be designed for a first flight condition with feedback and/or feed forward gains optimized for the first flight condition. In a simulated condition or a second flight condition, the gains are tested again. Perturbations may be repeated until a full flight spectrum has been analyzed and results stored in a computer look-up table or similar data structure. Further, the failsafe controller 106 may be in compliance with Radio Technical Commission for Aeronautics (RTCA) DO-178, pertaining to flight software and programming.

In some embodiments, the failsafe controller 106 may include a switch 126 or other means for halting control command output from one module and allowing control command output to proceed from another module. For example, the ML module 104 may be in communication with an autopilot 128 via the failsafe controller 106 and the switch 126 may function such that when any control command output is determined to be beyond the baseline, above the threshold, or outside the safety envelope 124, then the ability to output control commands to the autopilot 128 is removed from the ML module 104 and given to the failsafe controller 106, the autopilot 128, or a combination thereof, via the switch 126. In some embodiments, the switch 126 enables and disables an estimated output data channel (e.g., a portion of an "E" channel) or enables a failsafe control data channel (e.g., "C" channel).

In some embodiments, the switch 126 may implement a one-way device such that once switched the switch 126 will not switch back. For example, if the security of the system 100 is determined to have been breached or the integrity of data traveling between the observation sub-system 102, the ML module 104, and the failsafe controller 106 is determined to have been compromised, then the switch 126 may utilize the one-way device to prevent the switch 126 from giving control back to the ML module 104 without accessing the one-way device. For example, the one-way device may be a fuse, an anti-fuse, a dielectric anti-fuse and high voltage pulse, burning of one or more fuse bits, or combinations thereof.

In some embodiments, the ML module 104, the failsafe controller 106, and the autopilot 128 may be in communication with a vehicle control system 130. The vehicle control system 130 may include, but is not limited to, a directional control system for controlling position, speed, and/or direction of the platform 108. For example, the vehicle control system 130 may be an FCS communicatively coupled to an aileron, an elevator, a throttle, a control stick, a brake system, a rudder, an engine, a servo motor, a hydraulic system (e.g., hydraulic power pack), a display, or combinations thereof.

Figure 3:
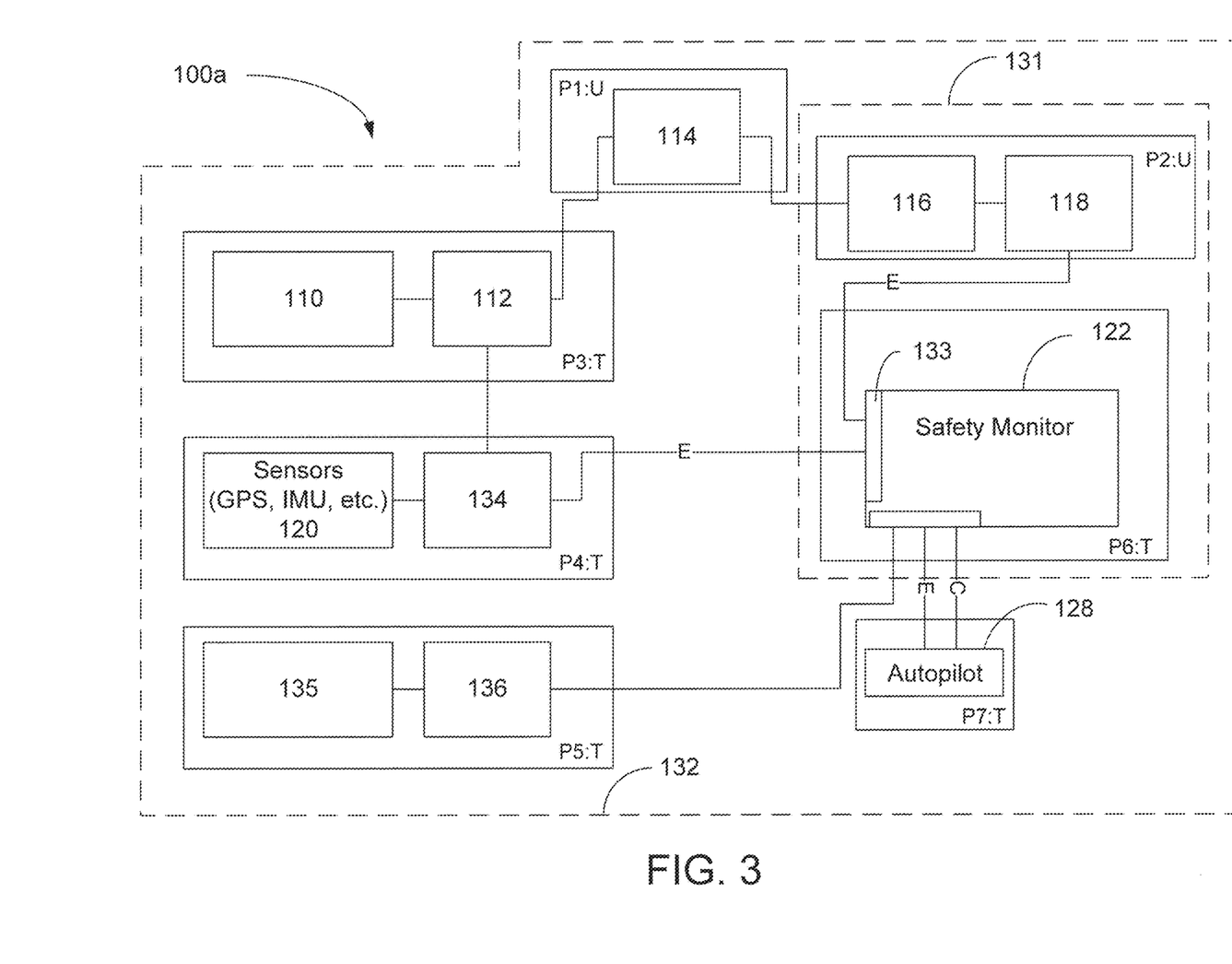
FIG. 3 is an exemplary embodiment of a block diagram of a partitioned apparatus for safe and secure practical autonomy according to the inventive concepts disclosed herein.

Referring now to FIG. 3, in some embodiments the different components of the system 100a may be separated into one or more individual partitions. For example, the observation sub-system 102, the ML module 104, the failsafe controller 106, and the autopilot 128 may be implemented on multiple, individual partitions (e.g., FIG. 3, P1-P7), such that logic, memory, or information for each individual partition may be managed and/or accessed separately by a central processing unit (CPU) or an operating system (OS) stored on a control display unit (CDU) or on the FMS in communication with the system 100.

It is noted that system 100a may function similarly to system 100 except that system 100a may be accessible by a partitioned operating system. For example, information within respective partitions of system 100a may be accessible by an ARINC 653 operating system. It is further noted that partitioned embodiments may obtain a size-weight-and-power-cost (SWAP-C) advantage that federated embodiments may not obtain.

In some embodiments, the partitions of system 100a may be individually or combinationally implemented on a single device. For example, partitions may be implemented on a portable computing device (e.g., tablet computer), a system on a chip (SOC), a Field Programmable Gate Array (FPGA), an application specific integrated circuit (ASIC), or combination thereof. For instance, partitions P2 and P6 may be combined onto single device 131.

In some embodiments, partitions may be separated as trusted and untrusted partitions of a hypervisor-based OS 132, where trusted partitions differ from untrusted partitions by at least one of: a DAL; an algorithm implemented therein; whether the partition is checked for safety, security, or both; an expected update rate; and combinations thereof. For example, P1:U of FIG. 3, an untrusted partition, may be designed to a lower DAL than the DAL of P6:T or P7:T, trusted partitions respectively for the safety monitor 122 and the autopilot 128.

In some embodiments, the untrusted partitions differ from trusted partitions in that untrusted partitions must be validated for both safety and security. For example, data associated with the trusted partition P7 may only be validated for security because of a high DAL associated with the autopilot of P7, while data associated with the untrusted partition P2 may be validated for both safety and security because of a lower DAL of a controller in P2 as compared to the DAL of the autopilot of P7.

In some embodiments, each trusted partition is reviewable for security and validity by the hypervisor-based OS 132. For example, each trusted partition may have a cryptographic signature securing entry into and out of it such that a respective trusted partition may be validated by the hypervisor-based OS 132. Further, a developer of configuration data may be required to cryptographically sign a finished product such that tampering with the finished product becomes evident. Cryptographic signatures may include, but are not limited to, a message authentication code (MAC), a cryptographic hash value, a checksum value, a digital signature including mathematical analysis for verifying validity/authenticity, or combinations thereof, for validating authenticity and/or integrity.

In some embodiments, further mathematical analysis and/or models may ensure security of the system 100. For example, a Bell and LaPadula model, a Harrison-Ruzzo-Ullman model, a Biba model, a Clark Wilson model, a Goguen and Meseguer model, a Communication Sequential Process (CSP), or combinations thereof.

In some embodiments, an application program interface (API) may be utilized to further ensure security. For example, a system integrator (e.g., FMS) may host all or a portion of the hypervisor-based OS 132 with definitions and structure for accessing individual partitions, however, one or more partitions accessible to the hypervisor-based OS 132 may have its own program definitions, allowable forms of input, and protocols such that data that is not in a proper format, input configuration, or does not use proper definitions and/or protocols will not be validated or authenticated for use by the hypervisor-based OS 132. Similarly, a stack interface may be utilized to ensure the security.

In embodiments, a data guard 133 may be programmed, attached, and or associated with the API or the stack interface to inspect communications that occur with the respective partition, API, or stack interface and ensure compliance with a ruleset. For example, the ruleset may include, but is not limited to, a protocol, definition, or data configuration (e.g., output from control stick requires at least two parameters including a direction in which and a position to which the control stick has moved), and the data guard 133 may be tasked with enforcing the ruleset. It is noted that although FIG. 3 only depicts the data guard 133 associated with a single partition (e.g., P6), this depiction is not meant to be limiting. For instance, the data guard 133 may be associated with multiple partitions or each partition of P1-P7.

In some embodiments, a digital signature may be associated with untrusted partitions. For example, the untrusted partition containing the ML module 104 may require cryptographic signing.

In some embodiments, the ML module 104 may be configured to be updated more frequently than the autopilot 128 or the failsafe controller 106 so as to be the most recent version of the ML algorithm at the time the highest DAL of the autopilot 128 or the high DAL for the failsafe controller 106 are obtained.

It some embodiments, a partition (e.g, P4) includes a state estimator module 134 for estimating a state of the platform 108 using trusted, mathematically verifiable algorithms. For example, the state estimator module may estimate a state of the platform 108 using linear transformation or geometrical relationships.

In some embodiments, components of the system 100 may be physically separated from other components. For example, the autopilot 128 may be implemented on the platform 108 and may be physically separated from the ML module 104 or the failsafe controller 106. For instance, the ML module 104 or the failsafe controller 106 may be implemented as a component of a secure UAS kit, where the mission computer implementing the ML module 104 or the failsafe controller 106 is located at a ground station 135 (see FIG. 4 below), while the autopilot 128 is located on the platform 108.

In some embodiments, the physically separated components may be communicatively coupled via one or more data links 136 that provide at least point-to-point (P2P) communication and/or fully networked communication (e.g., Ethernet). For example, the data link 136 may include, but is not limited to, a Link16 signal or signals from Control and Non-Payload Communications (CNPC) such as a signal having a CNPC-1000 waveform.

In some embodiments, the one or more data links 136 may include multiple data links and hardware for receiving signals for the data links such as a VHF data link, a CNPC data link, an Ethernet data link, an air traffic controller (ATC) data link, an aviation digital data service (ADDS) data link, or combinations thereof. Thus, one of the partitions (e.g., P5) may include a data link manager 138 (e.g., for performing a routing, switching, or similar function).

It is noted that the use of P2P networking may increase the ease of security implementation. For example, if security of a partition has been breached or integrity of data communicated between partitions has been compromised, severing or disabling a link between P2P connected nodes is quicker, easier, and more likely to ensure security than severing or disabling the various connections that may exist in other networking structures (e.g., as in a ring network). For instance, a partition (e.g., P5:T of FIG. 3) tasked with managing the data links 136 (e.g., data link manager 138) may be disabled by the CPU such that malicious code (e.g., virus) affecting the platform 108 does not spread to other components of the UAS kit (e.g., mission computer located at the ground station 135).

Figure 4:
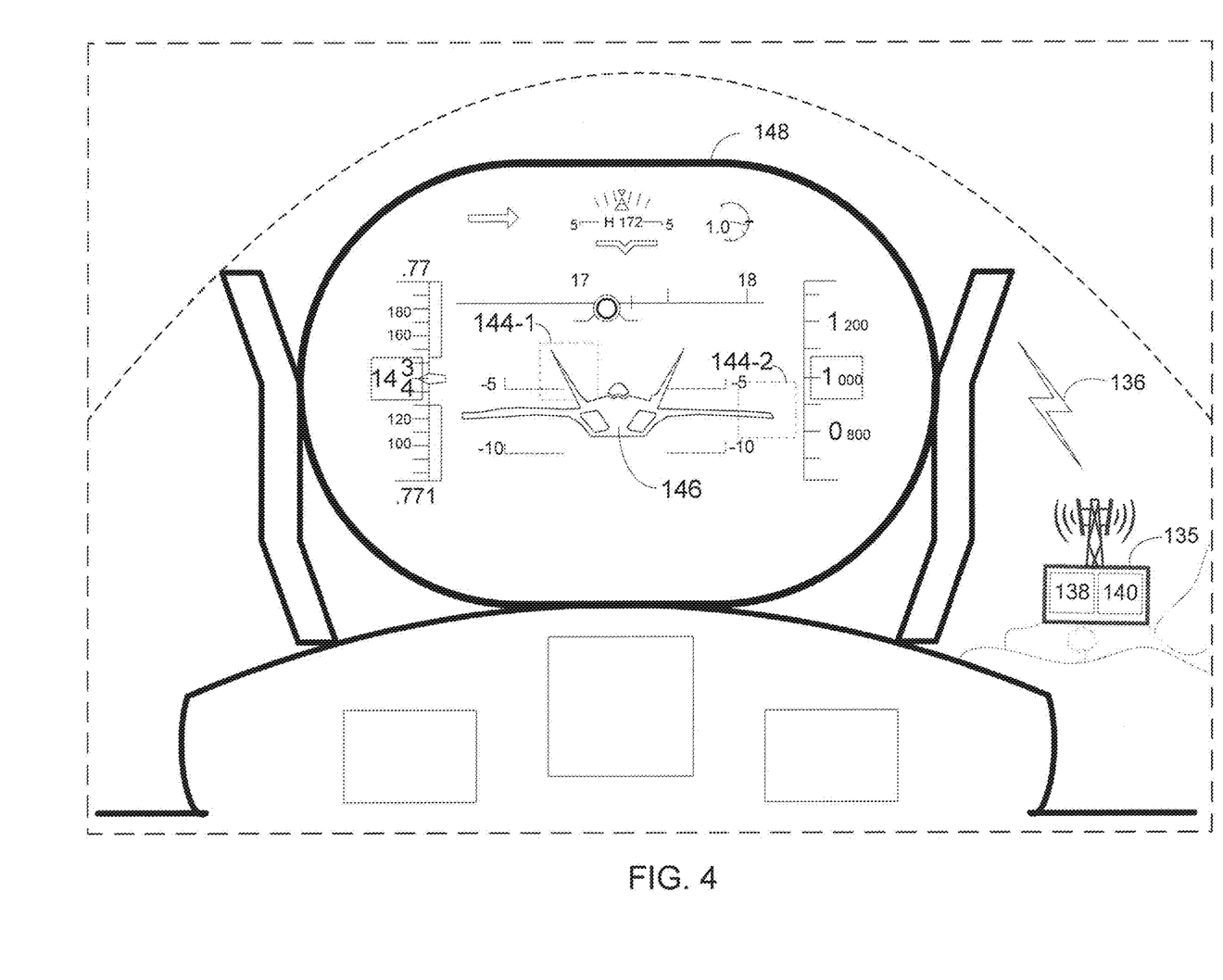
FIG. 4 is an exemplary embodiment of a view from a platform, according to the inventive concepts disclosed herein.

Referring now to FIG. 4, a view from a camera implemented as the input sensor 110 is depicted. The view may be from a UAS or from a cockpit of a manned UAS.

In some embodiments, the ground station 135 may implement a UAS mission computer including a simulation engine 140 and a display 142. For example, the platform 108 may be a UAS that relays real-time sensory data as input to the simulation engine 140, which is used to generate one or more images for display to an operator at the ground station 135. In some embodiments, the platform 108 may also output sensory data for to provide an augmented reality depiction on the display 142 for an operator of the platform 108 that is remotely located. In this regard, an operator at the ground station 135 may be able to see a display on display 142 that depicts what is captured by one or more cameras 110. In some embodiments, an operator may be located on the platform 108 as training takes place, or calibration of the ML module 104, such that a pilot may be in control of the platform 108 if necessary. In this regard, simulation or training data may be displayed on the platform 108.

In some embodiments, the ground station 135 may implement on the UAS mission computer a live virtual constructive (LVC) entity generator. The LVC generator may be a component of the UAS mission computer or may be physically separate from the UAS mission computer. The LVC generator may include, but is not limited to, a control stick/throttle, a display (e.g., the display 142), and a simulation engine. For example, an operator of an LVC entity may be presented with a simulated or augmented reality display that is similar to a display depicted at or on the platform 108, except that the display for the LVC entity is depicted as if the LVC entity were a lead aircraft, as with formation flight, and the platform 108 were a wingman. Thus, in some embodiments, the lead to which the platform 108 conforms, trains against, or performs its maneuvers may be a virtual lead.

In some embodiments, the system 100 is implemented as a "bolt on" or a line replaceable unit (LRU) for the platform 108. In this regard, the platform 108 may be a vehicle not currently configured for autonomous navigation according to the inventive concepts disclosed herein unless or until the LRU of the system 100 is communicatively coupled to the vehicle. For example, referring now to FIG. 5, an aircraft 108a may include one or more cameras 110 and an image processor 112 for obtaining and extracting real-world features 144. The aircraft 108a may include a navigation system 150 with multiple modules for determining one or more navigational solutions or performing location analysis, including but not limited to: differential GPS 152; vision-based absolute navigation 154; vision-based RELNAV 156; inertial, absolute navigation 158; navigational integrity monitoring 160; and a RELNAV fusion module 162 for determining which sensor inputs to use for a respective navigational solution. The aircraft 108a may also include a guidance and control system 164. The guidance and control system 164 may include a guidance and integrity module 166 for determining safety of control output with respect to a POF such as level-flight, and a guidance module 168 for determining coordinates of the aircraft 108a such that output may be provided to a control module 170 for activating an actuatable mechanism 172 (e.g., aileron, elevator, brake, engine, servo motor) to obtain the coordinates.

Figure 5:
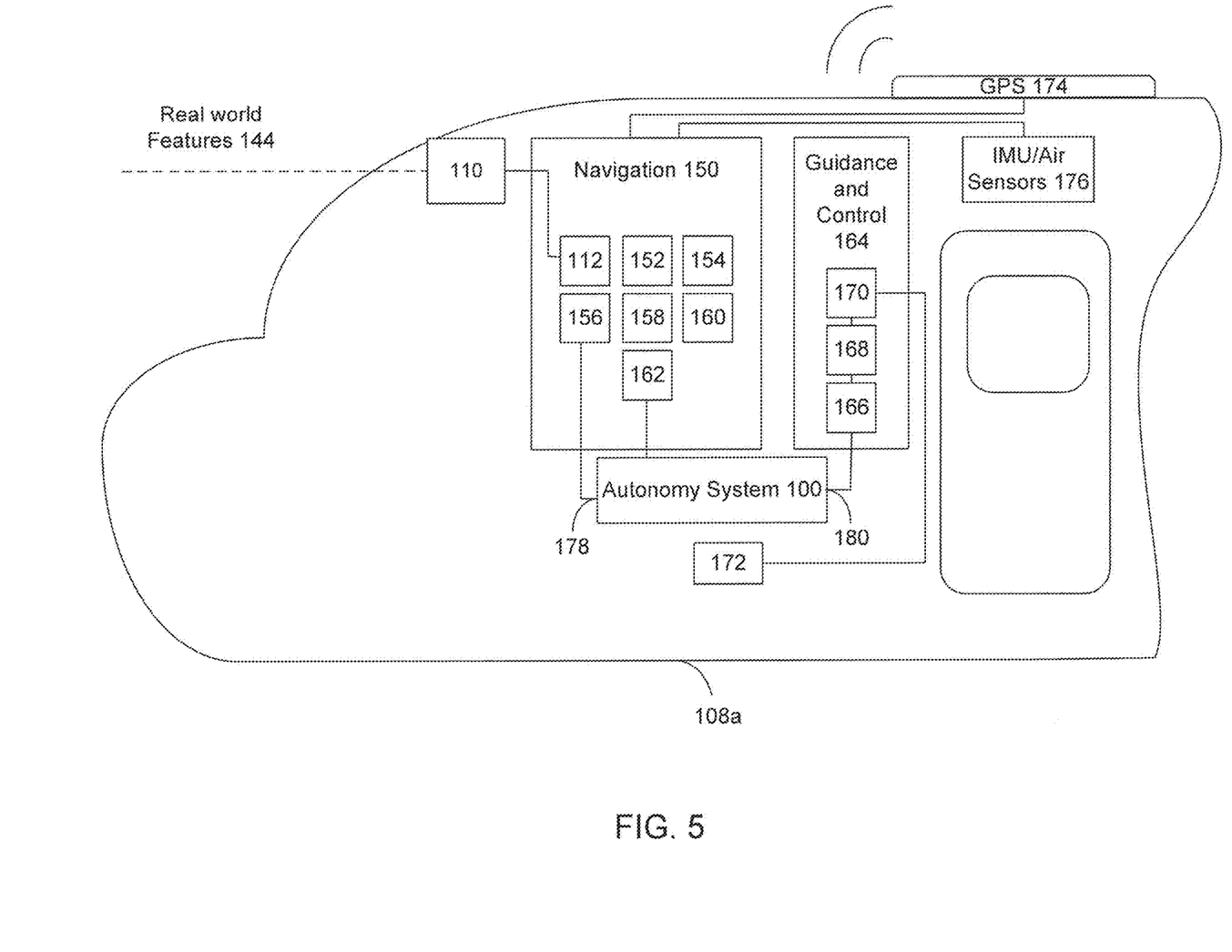
FIG. 5 is an exemplary embodiment of a block diagram of a system for safe and secure practical autonomy according to the inventive concepts disclosed herein.

In some embodiments, the navigation system 150 may be in communication with a GPS 174 and inertial (IMU) and air sensors 176 (e.g., pitot tube, pitot-static probe, static pressure gauge, angle of attack (AOA) sensor, temperature sensor, etc.). The GPS 174 may include an electronic scanning array (ESA) antenna.

In some embodiments, the LRU of the system 100 is connected to the aircraft 108a using existing modules of the aircraft 108a. For example, the controller 118 may be connected to the guidance integrity module 166 to expand the safety and integrity analysis of the system 164 and form the safety envelope 124. Further, a first connection may be established for providing additional processing or memory resources to the RELNAV fusion module 162 and for further determining which sensors are used for the autonomy function of the system 100. In this regard, the LRU of the system 100 may include a first port 178 for receiving multiple real-time operational parameters and multiple images of the real-world features 144. In some embodiments, the first port 178 may include multiple (e.g., two or more) input ports. An input to the input port may include one or more real-time parameters including, but not limited to, an altitude, a heading, a velocity or vehicle speed, a geofence boundary, a traffic collision detection, a radar return, a roll, a pitch, a yaw, a rate of roll, a rate of pitch, a rate of yaw, a descent rate, a flight path angle, an airspeed or Mach number, a load factor, an aerodynamic angle, and a surface deflection.

Further, the LRU of the system 100 may include a second port 180 for providing one or more navigational solutions, parameters for the one or more navigational solutions, or parameters for one or more maneuvers based on the multiple real-time operational parameters and the multiple images of the real-world features 144.

In some embodiments, the first port 178 and the second port 180 may be implemented as a single, bi-directional port. For example, a fiber optic coupler such as a 3 dB, 50:50 (coupling ratio) bidirectional coupler may be used.

It is noted that the ground station 135, the display 142, or the platform 108 may include, but is not limited to, one or more CPUs, graphical processing units (GPUs), graphics memories, and associated hardware, software, or firmware, which may be collectively coupled as one or more GPU cores or CPU cores for implementing a portion of the simulating, displaying, security monitoring, or safety monitoring.

Figure 7:
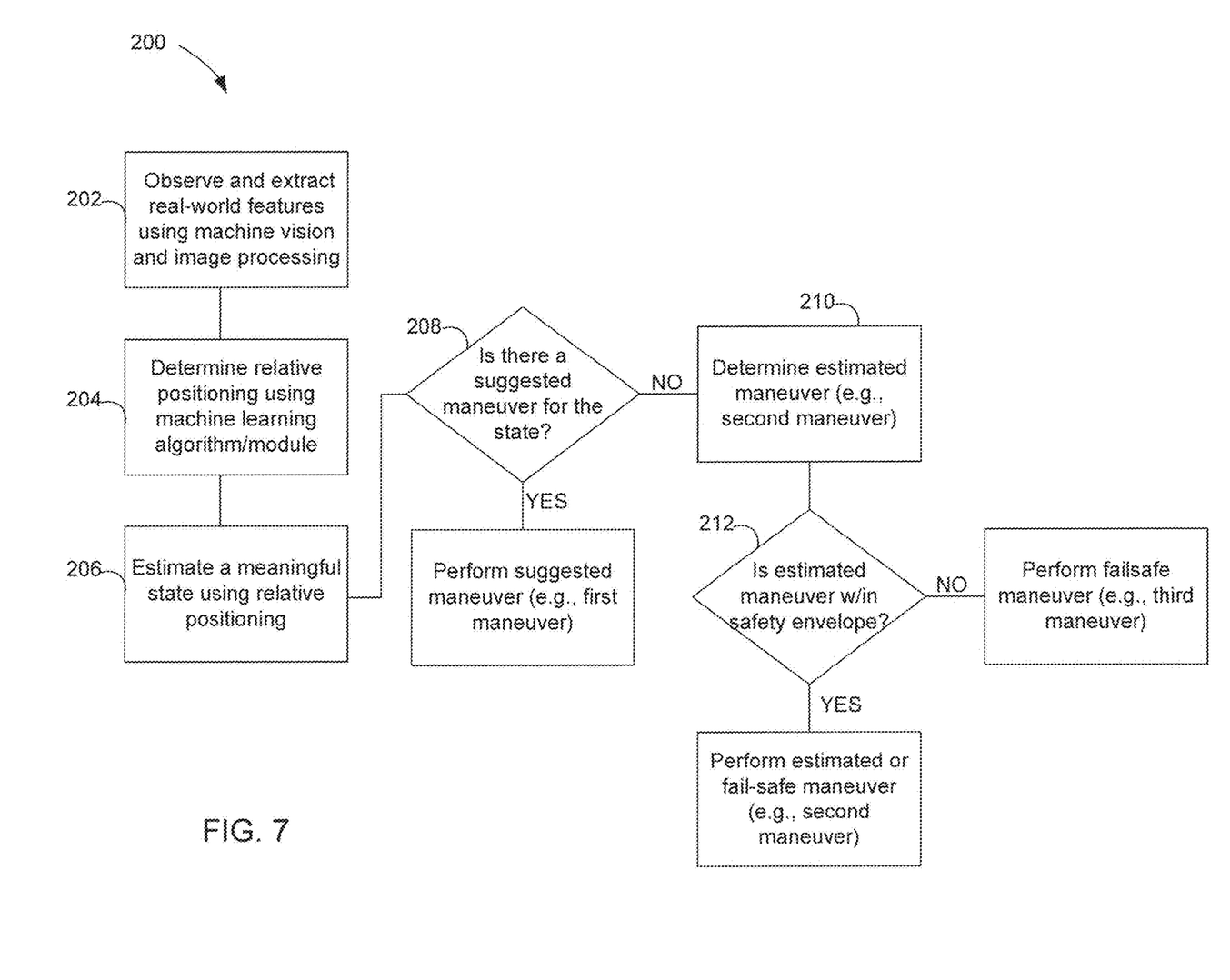
FIG. 7 is an exemplary embodiment of a method for safe and secure practical autonomy, according to the inventive concepts disclosed herein.

Referring now to FIG. 7 an exemplary embodiment of a method 200 according to the inventive concepts disclosed herein may include one or more of the following steps. For example, the method 200 may be a method for ensuring safety and security for autonomous maneuvering.

Figure 6:
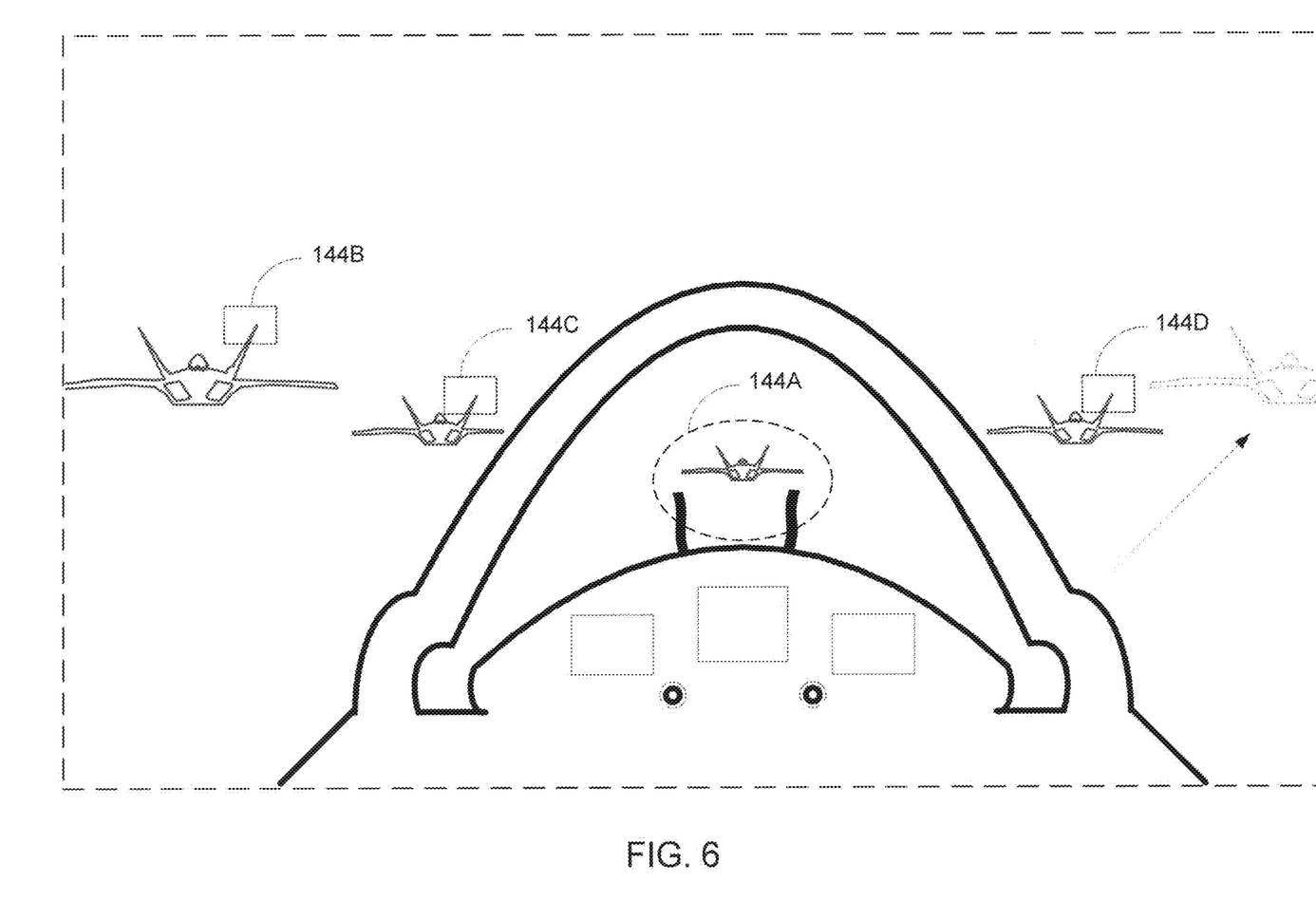
FIG. 6 is an exemplary embodiment of a view from a platform, according to the inventive concepts disclosed herein.

A step 202 may include observing/obtaining one or more observable parameters. For example, an image or a video stream of real-world features may be obtained and extracted with a camera and image processing for determining a relative position, or for determining a navigational solution including the relative position. For example, the navigational solution may be for formation flight (e.g., see FIG. 6). For instance, the real-world features may include different features (e.g., 144-1 or 144-2 of FIG. 4) of a single vehicle used as a reference for determining the relative position. By way of another example, the real-world features may include an entire vehicle (e.g., 144A of FIG. 6), or the same features (e.g., 144B-144D of FIG. 6) of multiple different vehicles used to determine the relative position.

The step 202 may also include obtaining observable parameters of operator input. For example, control throttle movement, spoken commands, or flight parameters corresponding to a maneuver may be obtained as observable parameters.

A step 204 may include determining the relative positioning using a machine learning module. For example, a ML module may implement a SLAM algorithm, a Kalman filter, a particle filter, a module for performing Monte Carlo statistical analysis, a Markov model for cluster analysis, or combinations thereof, to determine the relative position of a platform with respect to one or more vehicles (e.g., see FIG. 4).

A step 206 may include estimating a meaningful state using the relative positioning. For example, a state estimator may receive the relative position of the platform, which may include a position that is behind a 45-degree bearing line of a lead vehicle and a separation or a rate of change in separation between the lead vehicle and the platform may be outside an allowable limit. By way of another example, the ML module may input an observable parameter. In some embodiments, an aircraft display may display a warning with the state information: "Warning: Sucked/Closing too Fast!". In embodiments, the display or the warning may be accompanied by audio annunciations (e.g., tone, warning or alert signal, speech announcement, or combinations thereof). In embodiments, the display is only temporary to keep from distracting the pilot, or it is removed as soon as the state information no longer applies (e.g., the platform is maneuvered into proper formation). The state may include other meaningful representations based on the relative position, or also based on an absolute position as determined by GPS and/or IMU. For example, the state may include one of, or a combination of the following: acute, sucked, closing too fast, engaged, and disengaged.

A step 208 may include determining if there is a first maneuver correlated with the state of the platform. For example, a state may be "closing too fast" and a first maneuver may be a suggested maneuver for the state, which may include an "underrun" maneuver. The step 208 may include performing the suggested maneuver.

A step 210 may include determining a second maneuver for the state of the platform. For example, the ML module may incorporate fuzzy logic or one or more hidden nodes such that the estimated state of the aircraft lies somewhere between two or more previously known states. In this regard, the second maneuver determined by the platform may include an estimated maneuver that lies correspondingly between two or more previously known maneuvers. By way of another example, the estimated state may lie above/below a previously known state and the estimated maneuver may lie above/below a previously known maneuver. Step 210 may further include generating control output for the estimated maneuver. In some embodiments, the control output for the estimated maneuver is based on an observable parameter input into the ML module.

A step 212 may include analyzing the maneuver estimated in step 210 against the safety envelope. For example, the control output estimated in step 210 may be input into a safety monitor, which compares the control output with the safety envelope. For instance, the comparison may be carried out with a comparator circuit (not shown). Step 212 may include performing the estimated maneuver if it is within the safety envelope. Step 212 may further include performing a third maneuver if the second maneuver is not within the safety envelope. For example, the third maneuver may include a failsafe maneuver, which is based on the relative position, the absolute position, allowable parameters, observable parameters, and/or limits from the safety envelope. For example, an autopilot may be pre-programmed to perform one or more maneuvers to remove the platform from danger or take the platform to a safe location.

Figure 8:
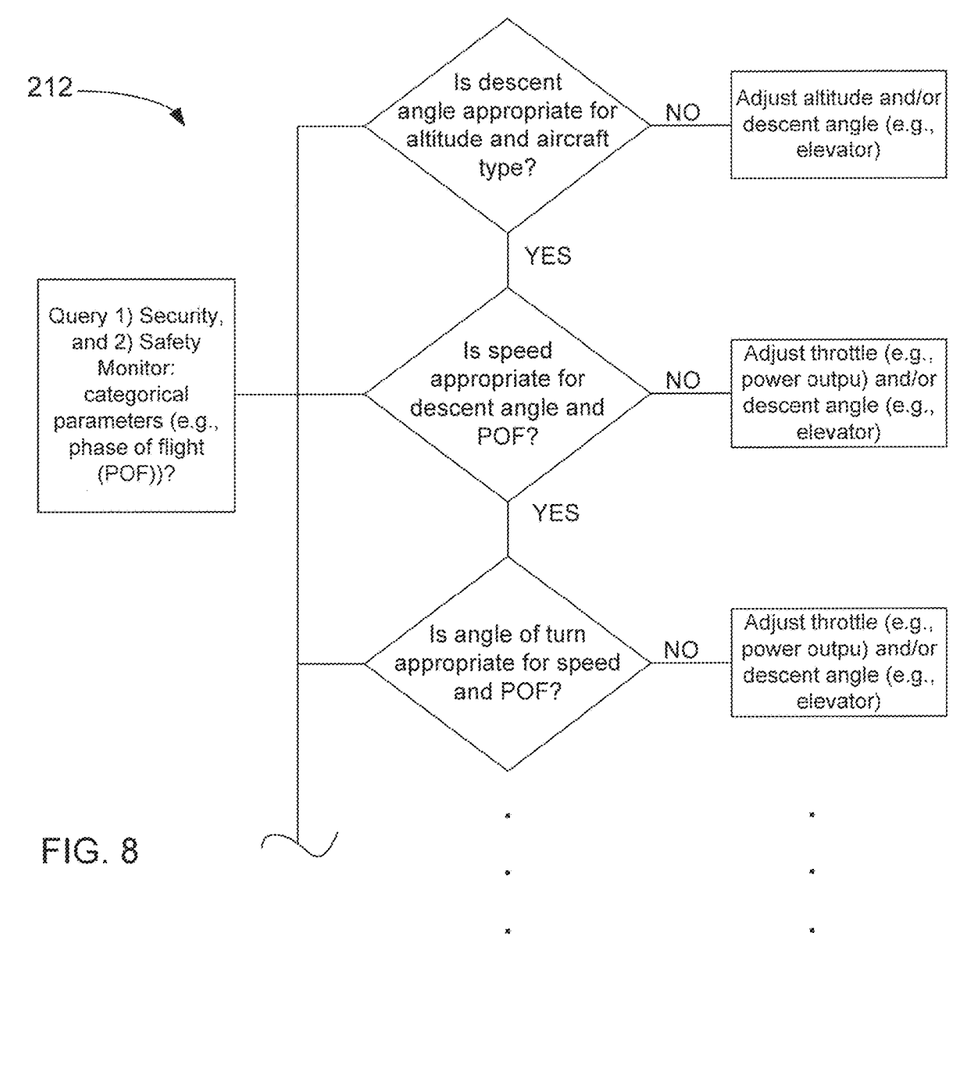
FIG. 8 is an exemplary embodiment of a portion of a step of the method from FIG. 7, according to the inventive concepts disclosed herein.

Referring now to FIG. 8, step 212 may include performing a check of a control output against every corresponding and relevant/applicable baseline, threshold, limit, or combination thereof, within the safety envelope.

In some embodiments, determining or obtaining categorical parameters including, but not limited to, the phase of flight (POF), aircraft type (e.g., passenger aircraft, fighter jet, small- to mid-sized aircraft, etc.), aircraft weight, load capacity, or combinations thereof, before or during a query to the safety monitor may help to reduce a number of checks performed by the safety monitor. For example, an elevator or aileron control baseline, threshold, or limit may be applicable if the POF is a descent, but output for such actuatable mechanisms may be irrelevant during a roll-out or taxi POF. By way of another example, an aircraft type may help determine applicable or relevant parameters, baselines, or limits. For instance, a single engine aircraft will not need to perform an allowable power output check against engine number four for a specific POF, but this may be a relevant or applicable check for a passenger aircraft.

In some embodiments, the system is pre-programmed such that one or more categorical queries have already been performed prior to real-time use of system (e.g., during calibration). For example, categorical parameters that do not depend on real-time input (e.g., vehicle weight, type, load capacity, etc.) may be pre-programmed such that an initial query during a safety check may include only those parameters that are dependent on real-time input. For instance, categorical parameters dependent on real-time input may include POF, vehicle or aircraft state, a mode for which the platform is used such as a training or a tactical mode, weather data such as wind-speed and wind-direction or precipitation, or combinations thereof.

Step 212 may include a security check performed by a hypervisor-based OS during real-time. For example, before or simultaneous with the query to the safety monitor, the security of partitions may be checked for appropriate cryptographic or digital signatures. If the validity or integrity of data were determined to be compromised during real-time operation of the platform, then a failsafe controller or autopilot would take control, disabling one or more modules and/or partitions of the platform, while simultaneously ensuring graceful degradation. In some embodiments the same limits, baseline, or safety envelope that maintain safety during real-time operation would be utilized to prevent complete shut-down of the platform when security has been compromised. In some embodiments, the autopilot takes full control, instead of safety monitor or failsafe controller, being preprogrammed to perform a failsafe maneuver (e.g., return to base).

It is noted that the security check of step 212 may be performed as a separate step (e.g., beyond or outside of step 212). For instance, the security check may be performed at initialization or start-up of the system or platform (i.e., before step 202) such that if any partition or module of the system or the platform is determined to be invalid or insecure, then the system or the platform fails to start-up and/or initialize.

It is further noted that FIG. 8 depicts only a small portion of allowable parameters, baselines, limits, or combinations being checked by the safety monitor. It is further noted that the inventive concepts of this disclosure are not limited by only those depicted in FIG. 8 but are meant to encompass all relevant and applicable parameters, baselines, limits, or combinations thereof.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. An apparatus for safe and secure practical autonomy, comprising:
   a controller having a non-transitory memory with instructions thereon and a processor in communication with the non-transitory memory, the processor configured to access the instructions;
   at least one port for receiving a real-time operational parameter for generating a navigational solution including a platform maneuver based on the real-time operational parameter and a position;
   a machine learning module communicatively coupled to the controller, wherein the instructions of the controller provide the processor access to a machine learning algorithm of the machine learning module to generate the navigational solution and direct the platform maneuver based on the position; and a safety monitor implementing a certifiable control algorithm and an operational safety envelope to preempt the machine learning module when the platform maneuver is outside the operational safety envelope, the operational safety envelope formed from a baseline or threshold associated with each control command of the machine learning module, the operational safety envelope is formed from a first real-time parameter used together in combination with a second real-time parameter, wherein the first real-time parameter is a radar return and the second real-time parameter is a separation distance threshold whereby the radar return is used with the separation distance threshold to establish the operational safety envelope.

2. The apparatus of claim 1, wherein the real-time operational parameter includes an observable parameter provided to the machine learning module as an input, and wherein the machine learning module directs the platform based on the position and the observable parameter.

3. The apparatus of claim 1, wherein the controller utilizes a cryptographic signature to ensure security of the machine learning algorithm and the certifiable control algorithm.

4. The apparatus of claim 1, wherein the certifiable control algorithm is certifiable according to Federal Agency of Aviation (FAA) standards, European Aviation Safety Agency (EASA) standards, or industry standards such as the American National Standards Institute (ANSI).

5. The apparatus of claim 1, wherein the operational safety envelope comprises a limit, a threshold, a baseline, or an appropriate safety level determined using two or more real-time parameters.

6. The apparatus of claim 1, further comprising an autopilot sub-system for performing the platform maneuver, wherein the autopilot sub-system is in communication with the safety monitor and is implemented in a sub-system designed to a design assurance level (DAL) higher than a DAL associated with the machine learning module.

7. The apparatus of claim 6, wherein the platform maneuver is a first maneuver and the autopilot sub-system is coupled to the safety monitor via a switch to perform a second maneuver when the machine learning module is preempted.

8. The apparatus of claim 1, wherein the first real-time parameter used together in combination with the second real-time parameter includes a limit, threshold, baseline, or appropriate safety level at least two of maximum/minimum safe altitudes, allowable single-axis control parameters for maintaining flight with respect to a roll axis, allowable two-axis control parameters for maintaining flight with respect to a pitch axis and the roll axis, or allowable three-axis control parameters for maintaining flight with respect to the roll axis, the pitch axis, and a yaw axis.

* * * * *